June 23, 1959   R. A. BENSON ET AL   2,892,181
VEHICLE BURGLAR ALARM

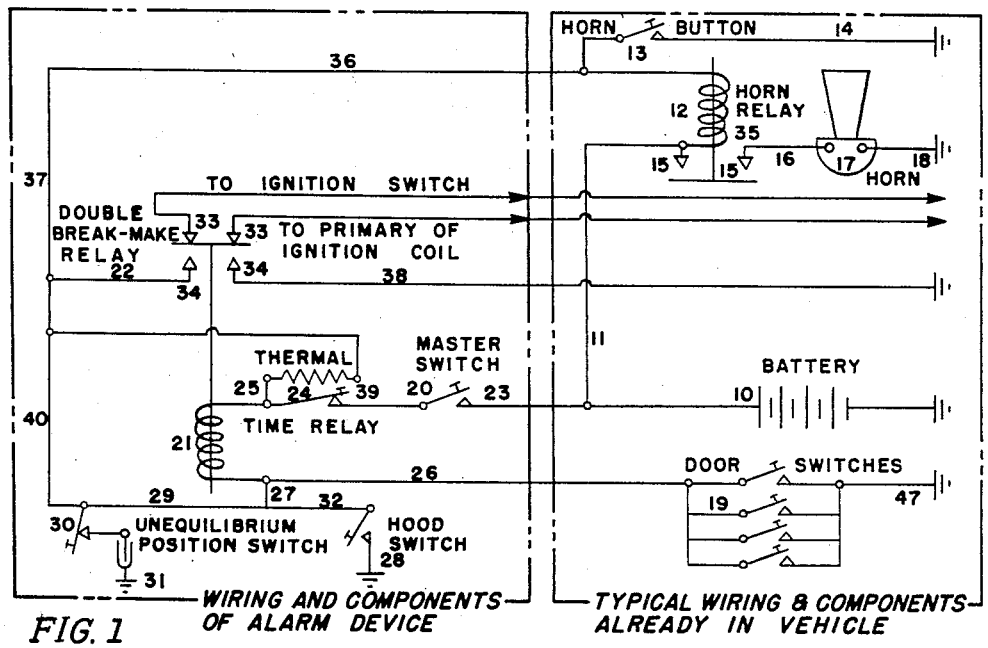

Filed Feb. 23, 1956   2 Sheets-Sheet 2

INVENTORS
RALPH A. BENSON
RAYMOND J. NOVOTNY

United States Patent Office 2,892,181
Patented June 23, 1959

2,892,181

VEHICLE BURGLAR ALARM

Ralph A. Benson and Raymond J. Novotny, Rockaway, N.J., assignors of thirty-three and one-third percent to John J. McGlew, Hasbrouck Heights, N.J.

Application February 23, 1956, Serial No. 567,332

6 Claims. (Cl. 340—64)

This invention relates in general to alarm devices and more particularly to burglar alarms for vehicles.

The object of the invention is to prevent theft of the vehicle or of the contents therein.

Another object of the invention is to prevent unauthorized persons from tampering with the vehicle.

Another object is to provide a simple alarm device that utilizes the existing vehicle electrical circuit to the fullest extent.

Still another object is to prevent excessive electrical current drain on the vehicle battery by providing for automatic shut-off of the actuated alarm by the alarm device after a predetermined period of time.

An additional object is to automatically place the circuit in a condition to be operated again after automatic shut-off of the actuated alarm.

An additional object of this invention is to render the vehicle ignition circuit inoperable.

Other objects and a fuller understanding of the invention may be had by referring to the following description and claims, taken in conjunction with the accompanying drawings in which:

Figure 1 is a schematic diagram of the apparatus and circuit connections of one form in which a double break-make relay is used.

Figure 2 is a similar diagram in which a double make relay is used.

Figure 3:
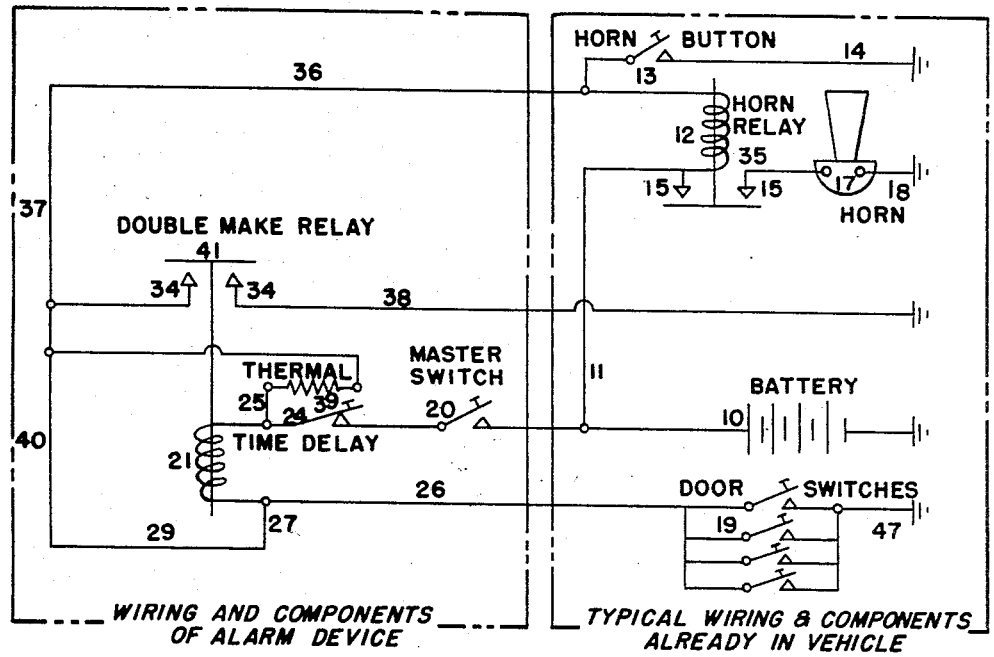
Fig. 3 is a similar diagram in which a double make relay is used and the hood switch and unequilibrium position sensing switch are eliminated.

The alarm device of the present invention is such that certain instrumentalities furnished with an automobile as standard equipment are used in forming a part of the alarm device. The essence of the present invention is to provide an alarm device for sounding the vehicle horn and/or rendering the ignition system of the vehicle inoperative when an unauthorized person opens a vehicle compartment and/or disturbs the equilibrium position of the vehicle. The vehicle horn will continue to function and/or the ignition system remain inoperative for a predetermined time period even though the actuated alarm switch is returned to its original position. After the predetermined time period has elapsed, the alarm device will automatically cease sounding the vehicle horn and/or the ignition system will become operative. The alarm device circuit is now placed in condition to be operated and ready to repeat the above cycle.

Referring now merely to the particular construction and operation of the forms shown in the drawings, reference to Figure 1 shows this form to include typical wiring and components already in the vehicle as shown substantially in the right half of the drawing. Wiring and components of the alarm device are shown substantially in the left half of the drawing.

The typical wiring and components already in the vehicle are the battery 10 which is connected via conductor 11 to the solenoid coil 12 of the horn relay 35 which can be grounded by the horn button 13 via conductor 14. Grounding the solenoid coil 12 of the horn relay 35 sounds the horn 17 by permitting current to flow thru the horn relay contacts 15 thru the conductor 16 to the horn 17 and then to ground via conductor 18. Several door switches 19 connected in parallel and to the ground via conductor 47 are also typical components and wiring already in the vehicle. The use of door switches 19 affords much convenience and simplicity to the alarm device.

The components and wiring of the alarm device are shown substantially in the left half of Figure 1. The alarm device consists essentially of a master switch 20 followed by a thermal time delay 25 which in turn is connected to a double break-make relay 22. Alarm actuating switches such as hood switch 28 and unequilibrium switch 31 are additional actuating switches of the alarm device. The switch 30 permits control over the circuit involving the unequilibrium position switch 31. This additional control gives greater flexibility to the entire alarm device since occasions may arise which do not require the sensitive protection given by this circuit.

Closing the master switch 20 places the circuit of the alarm device in the operating condition. The solenoid 21 of the double break-make relay 22 can now be grounded when any of switches 19, 28 or 31 are actuated by an unauthorized person. Grounding of the solenoid 21 permits current to flow from the battery 10 thru conductor 23, the closed master switch 20, thru the normally closed thermally sensitive switch 24 of the thermal time delay 25 and then thru the solenoid 21 of the double break-make relay 21, then to ground via either conductor 26, a door switch 19 and conductor 47 or conductors 27 and 32 and hood switch 28 or conductors 27 and 29, switch 30 and switch 31. Current flowing thru solenoid 21 of the double break-make relay 22 causes the normally closed relay contacts 33 to break and the normally open relay contacts 34 to make. Breaking relay contacts 33 interrupts the continuity of the ignition circuit. Making relay contacts 34 permits current to flow from the battery 10 thru the solenoid 12 of the horn relay 35 via conductor 11 and then to ground via conductors 36 and 37, relay contacts 34 and conductor 38. Making the normally open relay contacts 15 of the horn relay 35 causes the horn 17 to sound. Reopening any of the actuated switches 19, 28 or 31, as might very well occur when the frightened unauthorized person instinctively closes the door (reopens door switch 19) or closes the hood (reopens hood switch 28) or returns the vehicle to its equilibrium position (open unequilibrium switch 31), will not cause the horn 17 to cease sounding. This is due to the alternate path to ground via conductors 27, 29, and 40, relay contacts 34 and conductor 38 for the current flowing thru the solenoid 21 of the double break-make relay 22.

Current flowing thru the normally closed thermally sensitive switch 24 of the thermal time delay 25 not only flows thru the solenoid 21 as previously explained but also thru heater element 39 of the thermal time delay 25. After a predetermined time interval the heater element 39 will cause the thermally sensitive switch 24 to open. With the thermally sensitive switch 24 open, current will cease flowing thru the solenoid 21 of the double break-make relay 22 and cause the double break-make relay 22 to return to its normal position wherein relay contacts 33 are made and relay contacts 34 are broken. Making relay contacts 33 restores the continuity of the ignition circuit. However, breaking relay contacts 34 interrupts the flow of current thru the solenoid 12 of the horn relay 35 and causes the horn relay 35 to return to its normal position by breaking relay contacts 15. As a result of breaking relay contacts 15 the horn 17 will cease sounding.

In addition, the opening of the thermally sensitive switch 24 prevents current from flowing thru the heater element 39 and thereby permits the thermally sensitive switch 24 to cool and return to its normally closed position. However, closing the thermally sensitive switch 24 does not reactuate the double break-make relay 22 because the relay contacts 34 are broken and current cannot flow thru the solenoid 21 to ground via conductors 27, 29 and 40, relay contacts 34 and conductor 38.

The alarm device is again in a condition to be operated and will repeat its cycle when any of the door switches 19 or hood switch 28 or unequilibrium position switch 31 is actuated.

Referring to Figure 2, a double make relay 41 is used instead of the double break-make relay 35 shown in Figure 1. As a result, this particular construction of the alarm device does not interfere with the continuity of the ignition circuit. Otherwise, the construction and operation of the alarm device shown in Figure 2 is similar to the alarm device shown in Figure 1.

Figure 3 shows the alarm device in still a more elementary form. In contrast to the form of the alarm device shown in Figure 2, the unequilibrium position switch 31 and hood switch 28 are omitted in this particular construction. Therefore, only the door switches 19 can actuate the alarm device when it is armed. Otherwise, the construction and operation of the alarm device shown in Figure 3 is similar to the alarm device shown in Figure 2.

The foregoing description of the operation of the alarm device assumes that switches 19, 28 or 31 are returned to their original open position by the unauthorized person. In other words, it presumes the unauthorized person instinctively closes the compartment he has opened or returns the vehicle to its equilibrium position when the alarm device sounds the horn 17. If, however, in the unauthorized person's haste to make flight, the compartment is left open or the vehicle is left in an unequilibrium position (actuating switches 19, 28 or 31 remain closed), the alarm device functions in a somewhat different manner. However, the sequence of operations is similar to the previous description to the point where the thermally sensitive switch 24 of the thermal time delay 25 cools and returns to its normally closed position. When his condition is attained the double break-make relay 22 is actuated. This is due to the closed position of actuating switches 19, 28 or 31 which provide a path to ground for the current flowing thru solenoid 21 of the double break-make relay 22. Once relay contacts 34 of the double break-make relay 22 are made, the horn relay 35 is actuated. As a result the horn 17 sounds. The instant thermally sensitive switch 24 closes, current also flows thru the heater element 39. The thermally sensitive switch 24 is relatively warm from the initial heating by the heating element 39. Therefore, a comparatively short time period is required for the heater element 39 to open the thermally sensitive switch 24. When the thermally sensitive switch 24 opens, relay contacts 34 of the double break-make relay 22 are broken and the horn 17 ceases to sound. As the thermally sensitive switch 24 cools and returns to its normally closed position, the cycle repeats. Referring to Figure 1, it is apparent that whenever the horn 17 cycles to sound, the relay contacts 33 of the double break-make relay 22 will cycle to break and the continuity of the ignition circuit will be periodically interrupted. This is not the case with the simpler forms of the alarm device shown in Figures 2 and 3. In these figures the relay contacts 33 are eliminated and only a double make relay 41 is used. As a result, only the horn 17 will cycle.

Therefore, when an unauthorized person tampers with the vehicle and then leaves the vehicle in a vulnerable condition in his haste to make flight, the alarm device functions as follows:

(1) The alarm device sounds the horn 17 for a predetermined period of time and/or interrupts the continuity of the ignition circuit and then (2) The alarm device sounds the horn 17 in a cyclic manner and/or simultaneously interrupts the continuity of the ignition circuit in a similar manner for an indefinite period of time or until the vehicle is no longer in its vulnerable condition or the authorized person places the alarm device circuit in an inoperable condition.

Figure 4:
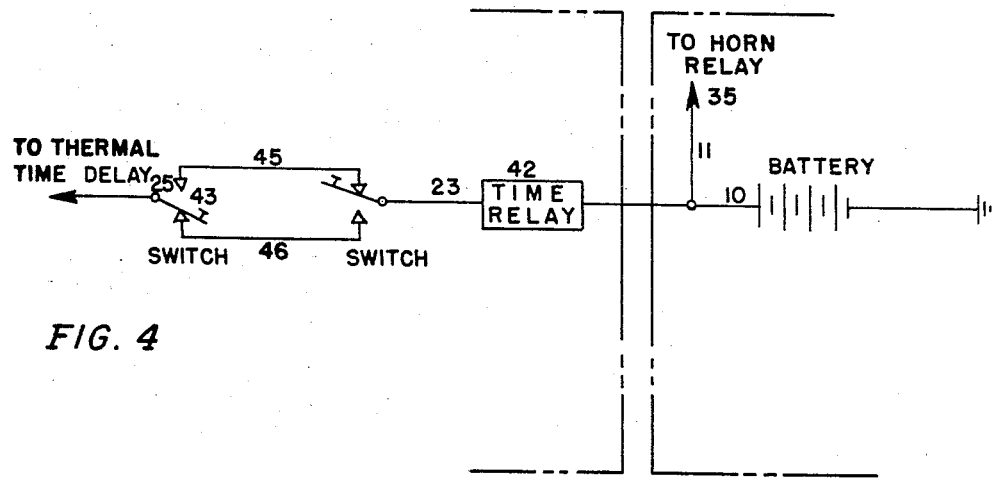
Figure 4 is a schematic diagram in which the control circuit is composed of two switches and a time delay.

It is desirable from the standpoint of convenience to locate the master switch 20 in the vehicle compartment containing the authorized person. However, it is necessary to temporarily interrupt the circuit controlled by the master switch 20 from within the vehicle compartment by the authorized person in order to permit the authorized person to leave the vehicle compartment without actuating the alarm device. A time delay 42 shown in Figure 4 is used for this purpose. Although no specific type of time delay is claimed in this invention, a pneumatic type time delay 42 will be considered for purposes of discussion. In addition to the pneumatic time delay shown in Figure 4, a switch 43 and switch 44 are used in a typical two switch three wire control circuit. This arrangement of switches permits one of the two switches, for example, switch 43 to be located in another vehicle compartment.

The operation of the control circuit shown in Figure 4 may be described as follows:

The authorized person within the vehicle compartment actuates the pneumatic time delay 42. This action interrupts the continuity of the alarm device circuit from battery 10 to conductor 23 for a predetermined period of time. During this predetermined period of time, the authorized person actuates switch 44 to the switch contact belonging to conductor 46. The authorized person then leaves the vehicle compartment and closes the vehicle compartment door. At the instant the door of the vehicle compartment was opened the alarm device could not be actuated because of time delay 42. However, after the predetermined time period has elapsed, the time delay 42 returns to its normally closed position and establishes continuity of the control circuit from battery 10 to conductor 23. If the alarm device is now actuated by an unauthorized person, current can flow from the battery 10 thru the time delay 42, conductor 23, switch 44, conductor 46, switch 43, thermal time delay 25 and then to the remainder of the alarm device as shown in Figure 1, 2 or 3.

In order to reenter the vehicle compartment without actuating the alarm device, the authorized person will first place the alarm device circuit in an inoperable condition by actuating switch 43 located in a vehicle compartment to which he has access. Actuating switch 43 to the switch contact belonging to conductor 45 disrupts the continuity of the control circuit because switch 44 is still in contact with the switch contact belonging to conductor 46. Therefore, no current can flow from the battery 10 to the thermal time delay 25 and actuate the alarm device when the vehicle compartment is reentered.

The construction and operation of the control circuit shown in Figure 4 may be used with the forms of the invention shown in Figures 1, 2 and 3 to increase the versatility and usefulness of the invention.

Although we have described our invention with a certain degree of particularity, it is understood that the present disclosure has been made by way of example and that numerous changes in the details of construction and the combination and arrangement of parts may be resorted to without departing from the spirit and the scope of the invention as hereinafter claimed.

We claim:

1. An apparatus for securing a vehicle against tampering, entry or theft, said vehicle including an electrically actionable horn, a battery, and an electrical ignition circuit, comprising a thermal time delay switch and normally open disturbance actuated switching means connected in series to said battery; a relay coil connected in series with said battery and said normally open disturbance actuated switching means; said battery, said thermal time delay switch, said relay coil and said normally open disturbance actuated switching means comprising a circuit for automatically placing said apparatus in a condition to be operated again, said circuit responsive to a closed condition of said normally open disturbance actuated switching means by effecting intermittent operation of said electrically actionable horn.

2. An apparatus according to claim 1 having the closed condition of said normally open disturbance actuated switching means effect intermittent operation of said electrically actionable horn and said electrical ignition circuit.

3. An apparatus according to claim 1 including a master switch connected in series with said thermal time delay switch and said battery.

4. An apparatus according to claim 1 having a three-way circuit made "on" or "off" with switches from either end, said three-way circuit in series with a time delay switch and said time delay switch in series with said battery, said "on" or "off" switches of said three-way circuit and said time delay switch being located on said vehicle in obscure but accessible locations.

5. A burglar alarm for a vehicle having an electrical ignition circuit and ground connection means, comprising a relatively small housing for attachment in an obscure but accessible location, a thermal time delay switch mounted in said housing, means including an ignition circuit relay having an actuating coil in said housing, contact means in said housing for connecting said thermal time delay switch in series with said battery, for connecting said ignition circuit relay actuating coil in series with said battery, said ignition circuit relay having contact means for connecting said ignition circuit relay in said ignition circuit, for connecting a horn relay actuating coil across said thermal time delay switch, an alarm switch located as desired on said vehicle and means on said housing for connecting each of said alarm switch, said battery, said horn relay actuating coil and said ground connection.

6. A burglar alarm for a vehicle having an electrically actionable horn, a battery and an electrical ignition circuit, comprising a relatively small housing for attachment in an obscure but accessible location, a thermal time delay switch mounted in said housing, means including a relay having an actuating coil mounted in said housing and said relay operably retaining said electrical ignition circuit in a normally closed condition while simultaneously operably retaining the circuit of said electrically actionable horn in a normally open condition, contact means in said housing for connecting said thermal time delay switch in series with said battery, for connecting said actuating coil in series with said battery, for connecting said relay in said electrical ignition circuit, for connecting said relay in the circuit of said electrically actionable horn, for connecting said alarm switch in series with said actuating coil, and said battery, for connecting said alarm switch in series with said thermal time delay and said battery, for providing a ground connection to said vehicle, a three-way circuit made "on" or "off" with switches from either end, said three-way circuit in series with a time delay switch and said time delay switch in series with said battery, said "on" or "off" switches of said three-way circuit and said time delay switch being located in obscure but accessible locations.

References Cited in the file of this patent

UNITED STATES PATENTS

| | | |
|---|---|---|
| 998,705 | Manson | July 25, 1911 |
| 1,650,288 | McDaniel | Nov. 22, 1927 |
| 1,720,230 | Murray | July 9, 1929 |
| 1,844,338 | Rupert | Feb. 9, 1932 |
| 2,014,286 | Nelson | Sept. 10, 1935 |